US007013491B2

(12) United States Patent
Ferrara

(10) Patent No.: US 7,013,491 B2
(45) Date of Patent: Mar. 21, 2006

(54) SPORT CAP

(76) Inventor: Dean Ferrara, P.O. Box 1174, Williston, VT (US) 05495

( * ) Notice: Subject to any disclaimer, the term of this patent is extended or adjusted under 35 U.S.C. 154(b) by 80 days.

(21) Appl. No.: 10/387,057

(22) Filed: May 19, 2003

(65) Prior Publication Data

US 2004/0231030 A1   Nov. 25, 2004

(51) Int. Cl.
*A42B 1/24* (2006.01)
(52) U.S. Cl. ............................. 2/209.13; 2/10; 351/155
(58) Field of Classification Search ............... 2/209.13, 2/12, 195.1, 10, 452, 13, 422, 424; 351/155–157, 351/118, 158; 242/385.1, 385.3
See application file for complete search history.

(56) References Cited

U.S. PATENT DOCUMENTS

| | | | | |
|---|---|---|---|---|
| 3,397,026 A | * | 8/1968 | Spina .......................... 351/157 |
| 4,549,793 A | * | 10/1985 | Yoon ........................... 351/156 |
| 5,581,821 A | * | 12/1996 | Nakano .......................... 2/422 |
| 5,790,228 A | * | 8/1998 | Bell, III ..................... 351/118 |
| 5,898,472 A | * | 4/1999 | Oshikawa .................... 351/156 |
| 5,905,560 A | * | 5/1999 | Daniel ......................... 351/157 |
| 5,970,523 A | * | 10/1999 | Atkins ....................... 2/209.13 |
| 6,154,887 A | * | 12/2000 | Yagi ........................... 2/175.7 |
| 6,282,721 B1 | * | 9/2001 | Travalgia ........................ 2/171 |
| 6,446,265 B1 | * | 9/2002 | Moreau et al. .............. 2/175.7 |
| 6,644,807 B1 | * | 11/2003 | Hood .......................... 351/155 |

* cited by examiner

Primary Examiner—Katherine M. Moran

(57) ABSTRACT

A baseball style cap having a retractable cord, which can secure eyewear to the face and or the brim of the cap, which will thereby prevent a loss of the eyewear and or cap rendering the eye wear easily accessible. In the preferred embodiment is a hidden retractable cord secured to the inside of the headband of the cap, two eyewear fasteners will secure the eyewear to the cap, while either being worn on the face or being stored on top of the brim.

29 Claims, 3 Drawing Sheets

SPORT CAP

BACKGROUND OF THE INVENTION

1. Field of the Invention

The present invention generally relates to wearing apparel. More specifically, the present invention is drawn to various headwear such as a baseball style hat or cap and sun visor having structures for retention of eye wear to the face or headwear.

2. Description of the Related Art

One of the several pieces wearing apparel items, which seem to have attained universal appeal, is the baseball style cap. Both males and female's young and old wear the baseball style cap, often displaying sports team or company logos. A great number of baseball style cap aficionados also wear some type of eyewear (corrective, protective lenses or shades).

There are many instances when the eyewear user may choose to remove the eyewear for a short period, or they may want a means to protect against the loss of either the eyewear or cap in adverse conditions. The eyewear is usually laid aside and is oftentimes accidentally broken. In day-to-day use or extreme weather conditions, the cap and or eyewear can be lost, thus necessitating expenditure of time and money for replacement. A convenient means to secure eyewear to a baseball style cap and or sun visor, or an effective means of securing a baseball cap to eyewear while at the same time providing a means to avoiding an accidental loss of either, would be a benefit for the user resulting in time and monetary savings.

There are many prior art devices for attaching eyewear to caps or hats and sun visors. Such mechanisms are costly additions to the expense of the cap and are easily broken if the cap is accidentally dropped or sat upon. They also do not address the action of protecting against loss of either eyewear or headwear by creating a one-piece structure while being worn.

Examples of the above prior art devices are shown in U.S. Pat. No. 2,725,560 (Feldman), U.S. Pat. No. 4,304,005 (Danley, Sr.), U.S. Pat. No. 4,541,125 (Phillips), U.S. Pat. No. 5,129,102 (Solo), U.S. Pat. No. 5,533,207 (Diaz), and U.S. Pat. No. 5,553,208 (Tonoyan et al.), U.S. Pat. No. 6,237,159 (Martin).

U.S. Pat. No. 5,052,054 (Birum) and U.S. Pat. No. 5,867,874 (Simpson) show implement holding devices removably attached to caps. The devices of the instant patents require the user to be concerned with a separate mounting for the cap.

U.S. Pat. No. 5,905,560 (Daniel) shows a loose fitting cord which does not retract and is not hidden when in use on the face or while eyewear is in storage. This patent the end user has to be concerned with loose fitting cords which could bring upon injury or loss of eyewear.

British Patent 345,833 shows a cap having means for detachably mounting the front of the cap to the peak. The patent does not disclose structure for supporting eyewear on the cap.

None of the above inventions and patents, taken either singly or in combination, is seen to disclose a cap having uncomplicated and efficient means for supporting and protecting eye wear as will be subsequently described and claimed in the instant invention.

SUMMARY OF THE INVENTION

The invention comprises a baseball style cap or sun visor structured to secure eyewear when said eyewear is worn on the face, or not in use. When in use, it also provides a means to protect against the accidental loss of either eyewear or headwear in adverse conditions.

In the preferred embodiment, the support structure includes two passages formed on each side of the cap or sun visor on the lower portion of the crown. Each passage is reinforced, as well known in the sewing art, to resist fraying. Retracting through the passage is the cord with the eyewear fasteners attached at the end. When a user attaches the eyewear fastener to his/her eyewear, he/she can now remove the eyewear safely since they are securely mounted to the eyewear fasteners. The eyewear is then securely mounted to the cap or sun visor to prevent loss and to make them easily accessible when needed. When eyewear is needed for use simply reach for them pull the eyewear forward in front of the visor and let them slowly retract back to your face. Or when eyewear is to be stored simply pull the eyewear off the face in front of the visor and let them retract and rest on top of the brim of the cap or the sun visor. When the eyewear is attached and worn, the one piece fit helps to keep the eyewear and headwear secured to the head during day-to-day or adverse weather conditions.

Although illustrated in conjunction with a baseball style cap, it is obvious that the instant invention can be applied to headwear of other types.

Accordingly, it is a principal object of the invention to provide structure to secure eyewear on both the headwear and the face, and to secure both the eyewear and headwear to the head in day-to-day or adverse weather conditions.

It is another object of the invention to secure the eyewear on headwear and the face which does not change the basic design or the style of the cap.

It is a further object of the invention to provide structure for supporting eyewear on the headwear and face, which structure is easy to use.

Still another object of the invention is to provide secure eyewear on the headwear wherein the eyewear is quickly accessible when needed.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
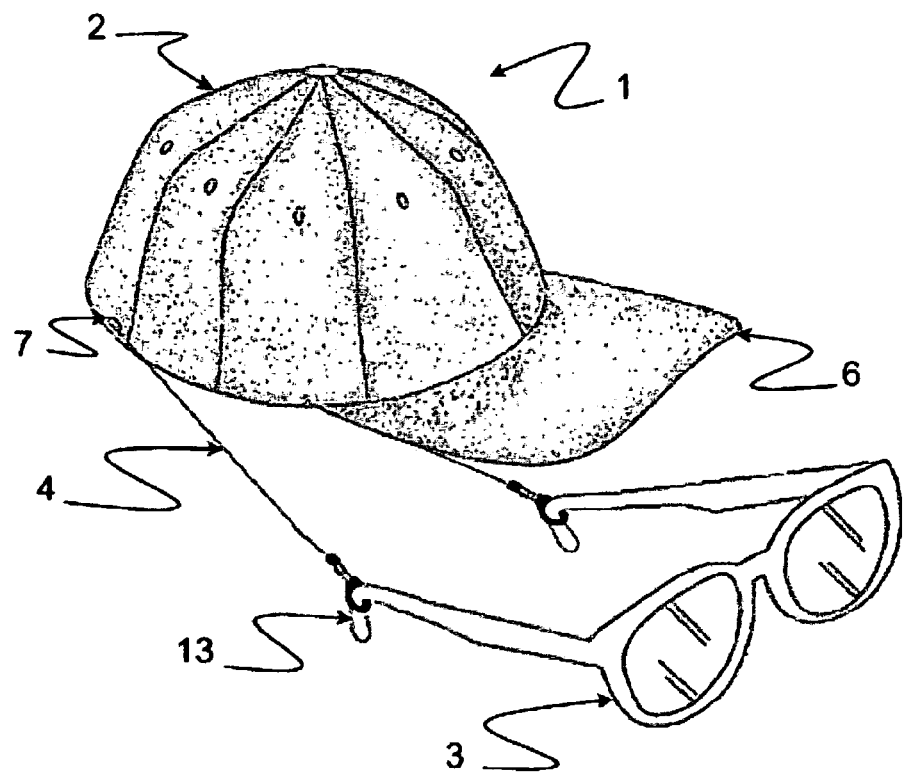
FIG. 1 is a perspective view of a baseball style cap for attaching eyewear according to a preferred embodiment of the present invention.

The cap of the preferred embodiment of the present invention is illustrated in FIG. 1 and is generally designated at 1. Cap 1 comprises a conventional body or crown 2 and visor 6. Disposed in each side of the crown's lower portion 2 (only one side shown) are passages 7 which are three-sixteenth of an inch in width. Passages 7 are formed in the crown's lower portion 2 in a conventional manner to resist fraying. The passages are approximately three inches from the rear end of the crown 2.

Figure 2:
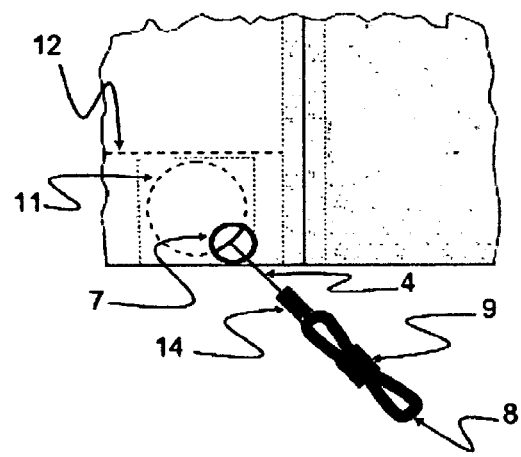
FIG. 2 is a detailed view of retractable cord.

FIG. 2 shows a detail view of the passage 7 along with the retractable cord 4. The retractable cord is made up of an eyewear fastener 8 with a spacer 9 in order to secure eyewear, where the cord is fixed firmly to the eyewear fastener 8 in the art of knot tying concealed with a rubber spacer 14. Reel 11 has retractable cord 4 attached to it, which is approximately two and one half inches from rear end of crown 2 reference to FIG. 1. Reel 11 will be various diameters, which is sewn between the headband 12 and the interior crown 2 of cap 1. Reel 11 will have a passage open for retractable cord 4 to slide through.

As depicted in FIGS. 1 and 2 when in use, end piece 13 of eyewear 3 are simply inserted through the eyewear fastener 8 on each side secured with a spacer 9. In this manner, eyewear 3 can be quickly and securely mounted on the headwear and are easily accessible when needed.

Figure 3:
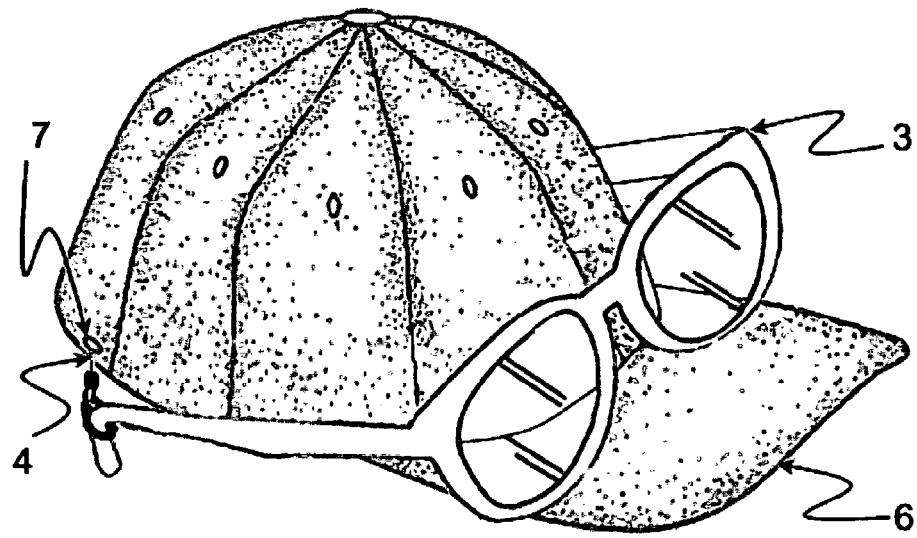
FIG. 3 is a perspective view displaying eyewear retracted and at rest on the visor.

FIG. 3 is a perspective view showing the eyewear 3 at rest on the visor 6 retracted by the cord 4 that is penetrating the passage 7.

Figure 4:
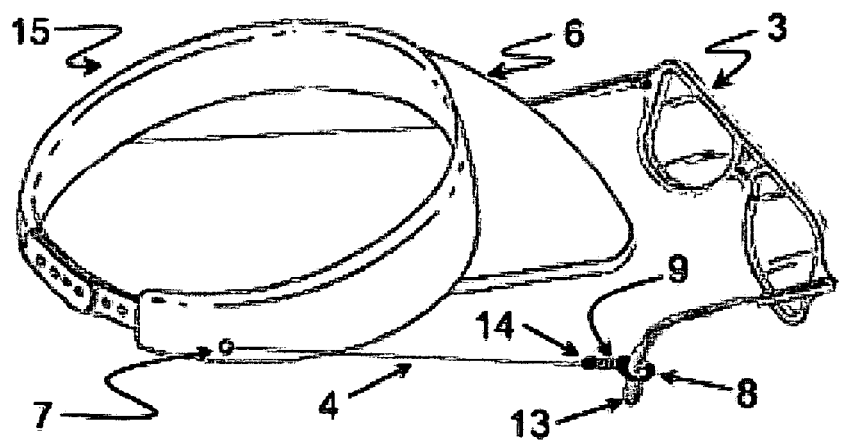
FIG. 4 is a perspective view of a sun visor for attaching eyewear.

FIG. 4 is a perspective view showing the headwear in the form of a sun visor 15, where eyewear 3 is extended past the visor 6. A sun visor 15 is the same style as a baseball style cap except without crown portion 2 as found in FIG. 1. Also depicted are numbers 4, 7, 8, 9, and 14 as depicted in FIG. 2. Number 13 represents as shown in FIG. 1 represents the end piece of eyewear.

Figure 5:
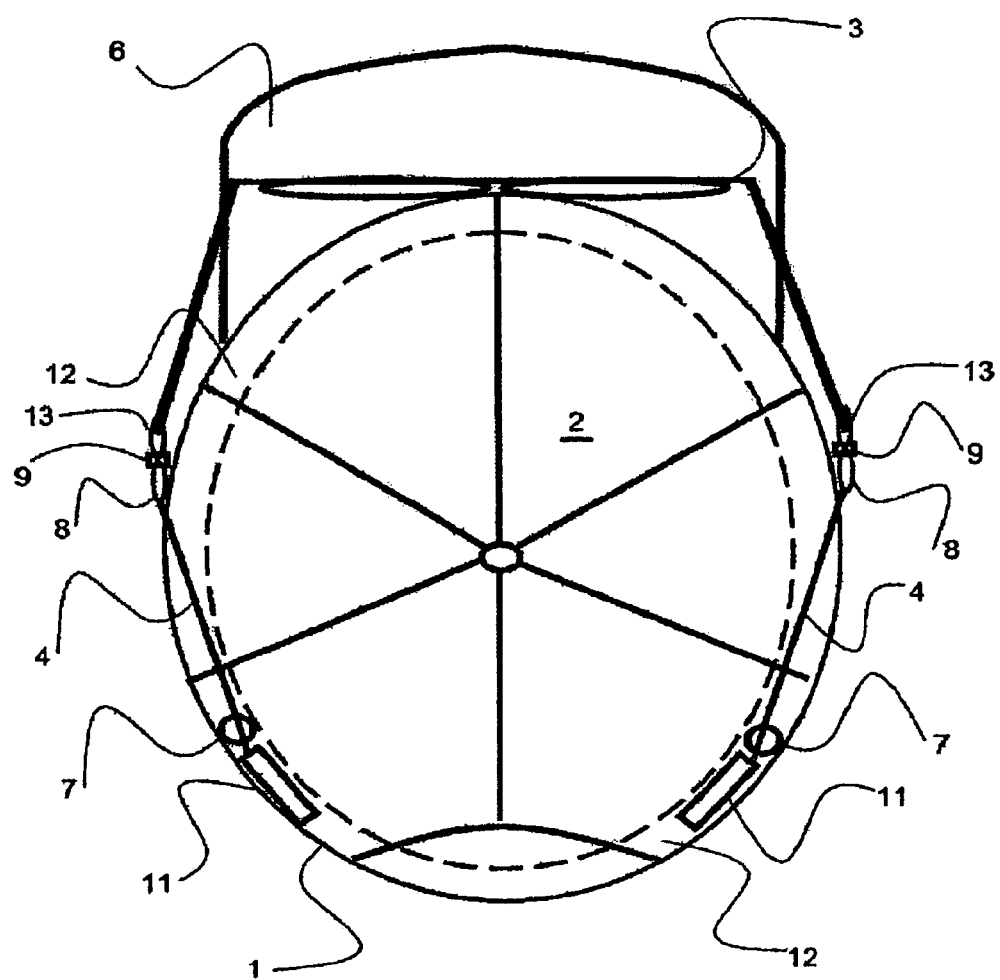
FIG. 5 is atop view of the headwear showing the cords extending through the passages to the reels that are located within the headband on both sides of the headwear.

FIG. 5 is a top view of headwear 1 showing retractable cords 4 mounted on each side of headwear 1 to slide through two passages 7 into headband 12 to two reels 11 that are located within headband 12 on both sides of headwear 1.

It is to be understood that the present invention is not limited to the embodiments described above, but encompasses any and all embodiments within the scope of the following claims.

I claim:

1. A wearable article that may be worn with eyewear, comprising a headwear and a retractor, said headwear wearable independent of the eyewear, said refractor mounted within said headwear, said retractor including a cord that retracts into said retractor, wherein said retractor includes a reel, wherein said cord includes an eyewear fastener, for fastening to a temple of the eyewear.

2. An article as recited in claim 1, further comprising a second retractor mounted within said headwear, wherein said second retractor includes a cord that retracts into said second retractor.

3. An article as recited in claim 2, wherein said retractor is mounted on a first side portion of said headwear and wherein said second retractor is mounted on a second side portion of said headwear, wherein said second retractor includes a reel.

4. An article as recited in claim 1, wherein said headwear includes a crown portion.

5. An article as recited in claim 1, wherein said headwear includes a hat.

6. An article as recited in claim 5, wherein said hat includes a baseball cap.

7. An article as recited in claim 1, wherein said headwear includes a visor.

8. An article as recited in claim 1, wherein said headwear includes a headband, wherein said retractor is located within said headband.

9. An article as recited in claim 8, wherein said headband includes a passage, wherein said cord is mounted to slide into said headband through said passage.

10. An article as recited in claim 9, wherein said passage is located along a side portion of said headband.

11. An article as recited in claim 10, wherein said headwear includes a crown having a rear end, wherein said passage is located approximately three inches from said rear end.

12. An article as recited in claim 1, wherein said headwear includes a crown having a rear end, wherein said reel is located approximately two and one half inches from said rear end.

13. An article as recited in claim 1, wherein said eyewear fastener includes a spacer.

14. An article as recited in claim 1, further comprising eyewear, wherein a temple of said eyewear is fastened to said eyewear fastener.

15. An article as recited in claim 1, wherein said headwear includes a visor, wherein said eyewear can be mounted on said visor.

16. An article as recited in claim 1, further comprising eyewear, wherein said eyewear is attachable to said eyewear fastener.

17. A wearable article, comprising a headwear, a first retractable cord and a second retractable cord, a first reel, and a second reel, wherein said headwear includes a front portion, a first side portion, and a second side portion, wherein said first retractable cord is connected to said first reel on said first side portion and said second retractable cord is connected to said second reel on said second side portion wherein said headwear includes a rear end, wherein said first reel is located approximately two and one half inches from said rear end.

18. An article as recited in claim 17, wherein said headwear includes a crown portion.

19. An article as recited in claim 17, wherein said headwear includes a hat.

20. An article as recited in claim 19, wherein said hat includes a baseball cap.

21. An article as recited in claim 17, wherein said headwear includes a visor.

22. An article as recited in claim 17, wherein said headwear includes a headband, wherein said first reel and said second reel are located within said headband.

23. An article as recited in claim 22, wherein said headband includes a first passage and a second passage, wherein said first retractable cord is mounted to slide into said headband through said first passage and said second retractable cord is mounted to slide into said headband through said second passage.

24. An article as recited in claim 23, wherein said first passage is located approximately three inches from said rear end.

25. An article as recited in claim 17, wherein said cord includes an eyewear fastener.

26. An article as recited in claim 25, wherein said eyewear fastener includes a spacer.

27. An article as recited in claim 25, further comprising eyewear, wherein a temple of said eyewear is fastened to said eyewear fastener.

28. An article as recited in claim 27, wherein said headwear includes a visor, wherein said eyewear can be mounted on said visor.

29. A method of storing eyewear, comprising:
 a) providing a headwear;
 b) providing a retractor within said headwear, wherein said retractor includes a retractable cord that retracts into said retractor, wherein said refractor includes a reel;
 c) connecting the eyewear to said retractable cord; and
 d) storing said eyewear on said headwear.

* * * * *